United States Patent Office 3,203,885
Patented Aug. 31, 1965

3,203,885
OXIDIZED STARCH PRODUCT AND METHOD OF MAKING THE SAME
Alfred F. Meiners and Francis V. Morriss, Kansas City, Mo., assignors to Department of Agriculture and Inspection of the State of Nebraska, Lincoln, Nebr.
No Drawing. Filed Jan. 15, 1962, Ser. No. 166,364
7 Claims. (Cl. 204—158)

The present invention relates to an improved oxidized starch product and to a method for manufacturing this product.

The products of the present invention are characterized by a high percentage of carbonyl content which may be as high as 25 mole percent or more, making them useful in many applications such as wet strength additives for paper, tanning agents for leather, cross-linking agents for textiles, and similar purposes.

A considerable amount of development work has been done on the oxidation of starch by means of chlorination. Most starch oxidations have been done under conditions of either high pH values and high temperatures, or both, or under very mild conditions. When the more strenuous conditions were used, over-oxidation or carbonyl decomposition occurred, while under less strenuous conditions, little or no carbonyl formation resulted.

One of the principal objects of the present invention is to provide an improved process for the manufacture of oxidized starches with high carbonyl content.

Another object of the invention is to provide an improved method for the manufacture of oxidized starches at low cost and at high yields.

Still another object of the invention is to provide an improved process for the oxidation of starch by chlorine water which can be carefully controlled to produce a product having a high carbonyl content.

A further object of the invention is to provide an improved oxidized starch product containing as much as 25 or more mole percent carbonyl groups.

We have now found that a high carbonyl content starch product can be made under carefully controlled reaction conditions in a selective oxidation process. Specifically, we have found that a high carbonyl content starch may be produced by treating an aqueous starch suspension either in bulk or in the form of a thin film with chlorine at a pH not in excess of about 7, while irradiating the same with actinic light at a temperature not in excess of about 60° C., and preferably below 20° C. Under these conditions, the carbonyl content of the starch is substantially increased to values of 10 to 25 mole percent or more. In contrast, previous techniques for the oxidation of starch with chlorine water resulted in carbonyl contents on the order of 5 mole percent or less.

When conducting the reaction in bulk, it is important to keep the concentration of the starch suspension to less than about 10% by weight because at concentrations in excess of about 10% the suspension is opaque to the beneficial radiation, and very little reaction occurs. When the starch is irradiated in the form of a film, however, higher concentrations may be employed.

The source of the starch may be any high quality starch such as a starch derived from corn or from potatoes, and the starch fractions need not be separated for the purposes of this process.

The control of the pH is very important to secure the improved results of this invention. At pH values in excess of about 7 extensive decomposition of the aldehyde groups occurs. At pH values of 9 or above, the decomposition is quite rapid. Accordingly, we prefer to maintain the pH at a value in the range from about 0.5 to 6.0, and more preferably at a pH value of 1.0 to 2.0, the pH adjustment being made by the addition of mineral acids, or organic acids. Since hydrochloric acid is generated as the reaction proceeds, it is sometimes necessary to add a buffer, or an alkali, or both to maintain the proper pH range. Where buffering is required, it is generally most advisable to add an organic acid together with its alkali or alkaline earth salt (e.g., acetic acid with sodium or calcium acetate).

The irradiation used in the process of the present invention may be derived from many sources, but we prefer to employ ultraviolet irradiation having predominating intensities in the wavelengths of 360 to 380 millimicrons. Actually, water is highly transparent to such irradiation even at 220 millimicrons, but the vessel in which the reaction takes place provides a limit for the wavelengths which can be employed. Generally, the use of glass vessels excludes wavelengths below about 300 millimicrons, although this limitation is not present in the use of quartz or other materials more transparent to ultraviolet.

The irradiating light need not be solely ultraviolet. Substantial improvements in the rate of reaction and in the nature of the reaction product are obtained under irradiation from an ordinary tungsten filament incandescent lamp, or even sunlight. However, we have found it most desirable to use ultraviolet irradiation since the benefits achieved are substantially greater, and the cost is not significantly higher.

Temperature control is also an important factor in securing the proper results. As mentioned previously, the temperature should not be in excess of about 60° C. and preferably is in the range from about 5 to 10° C. These temperatures can be easily achieved by operating the reaction in an ice bath.

The process of the present invention results in a selective oxidation within the anhydroglucose units (A.G.U.) of the starch which appears to be quite unique from the oxidation of starch materials in the past. The fundamental anhydroglucose unit can be represented by the following structural formula:

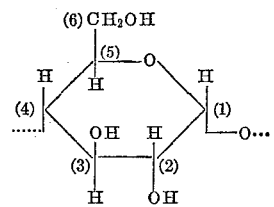

In building up the starch, these fundamental units are primarily linked through the No. 1 and No. 4 positions, so that almost no free hydroxyl groups are present at these positions. In the process of the present invention, the number six position is preferentially oxidized so that about one-half or more of the carbonyl content of the oxidized starches is due to the presence of aldehyde groups in the number six position. In addition to the oxidation in this position, there is some oxidation at the number two and number three positions, or both.

The following specific examples will illustrate more completely the process of the present invention and the results obtained.

*Example 1*

A 0.05 molar chlorine-water solution was cooled to 5 to 10° C., and corn starch in an amount of ten grams per liter of solution was added. An ice bath was used to maintain a temperature of 5 to 10° C. in the reaction mixture. A mercury vapor lamp (GE H–100 FL–4) was employed with a five inch filter to screen out most of the visible emission. The reaction time was about seven hours, and the mixture was stirred continuously.

The pH of the reaction mixture was in a range from 1 to 2.

At the completion of the reaction time, the product was found to have a carbonyl content on the order of 25 mole percent.

*Example 2*

A series of experiments was run to determine the effect of varying the ratio of chlorine to starch. In the first series, the ratio of chlorine to starch (moles of chlorine per A.G.U. of starch) was adjusted to 1 to 6. In the second series, the ratio was set at 1 to 3, and in the third series, the ratio of chlorine to starch was set at 1 to 2. In each case, ordinary tap water having a pH of about 8.5 was used. The temperature of the reaction mixture was lowered to 10° C. by the addition of small amounts of ice and by cooling in an ice water bath. The resulting solution had a pH of 2.4. The requisite amount of corn starch was added and the reaction mixture was illuminated with a mercury vapor lamp of the type described in Example 1, in combination with two sun lamps. No filters were used. The reaction vessel was composed of "Pyrex" glass, and the lamps were placed symmetrically around the reaction vessel. The ultraviolet lamp was placed about one inch from the reaction vessel and the sun lamps were placed 4 to 6 inches from the reaction vessel. The results of these three series of experiments are presented in the following table:

5 PERCENT CARBONYL STARCH

| Chlorine-Starch Mole ratio | Reaction Time (hr.) | Moles of Chlorine Consumed per A.G.U. of Starch | Average Reaction Rate (mM./liter/hr.) | Yield (percent) |
|---|---|---|---|---|
| 1:6 | 5.0 | 0.13 | 1.3 | 92 |
| 1:6 | 5.0 | 0.14 | 1.4 | 99 |

10 PERCENT CARBONYL STARCH

| 1:3 | 5.2 | 0.20 | 2.1 | 94 |
|---|---|---|---|---|
| 1:3 | 7.0 | 0.29 | 2.2 | 84 |
| 1:3 | 7.0 | 0.28 | 2.2 | 98 |
| 1:3 | 7.0 | 0.30 | 2.3 | 91 |

15 PERCENT CARBONYL STARCH

| 1:2 | 6.5 | 0.43 | 2.3 | 84 |
|---|---|---|---|---|
| 1:2 | 7.0 | 0.43 | 2.2 | 81 |
| 1:2 | 7.0 | 0.43 | 2.2 | 83 |
| 1:2 | 7.0 | 0.44 | 2.2 | 84 |
| 1:2 | 7.0 | 0.44 | 2.2 | 85 |
| 1:2 | 7.0 | 0.43 | 2.2 | 85 |

At the end of the experiments, the reaction mixtures were filtered, the carbonyl starch was washed with 95% ethanol, and air dried for one to two days until there was no odor of ethanol. The individual runs within a given series were combined and placed in ball mill and pulverized. Several times during this process, the material was sifted through a fine 80 mesh screen. Samples of all three carbonyl starches and the original corn starch were examined microscopically after the ball milling step under normal and polarized light. No differences in size, size ratio, or homogeneity were observed.

*Example 3*

The effect of pH on the reaction was determined in the following manner. The oxidation was carried out in the same manner as described in the preceding examples, except that the pH was initially raised to 4.0 to 4.5 with sodium hydroxide and maintained at this level by continuous addition of the alkali during the reaction. The results indicated that the reaction rates were much faster at the more alkaline pH values, but that the yields were considerably lower. A summary of the results obtained appears in the following table:

| Chlorine-Starch Mole Ratio | pH | Average Rate of Reaction (mM./liter/hr.) | Yield (percent) | Carbonyl Content (mole percent) | Moles of Chlorine Consumed per A.G.U. of Starch |
|---|---|---|---|---|---|
| 1:6 | 4.0–4.5 | 2.7 | 93 | 3.5 | 0.12 |
| 1:6 | 2.4 | 1.5 | 99 | 4.5 | 0.14 |
| 1:3 | 4.0–4.5 | 5.4 | 82 | 10.5 | 0.28 |
| 1:3 | 2.4 | 2.3 | 91 | 10.6 | 0.30 |

*Example 4*

It was also found that the gelatinization of the starch resulted in a substantial increase in the reaction rate. In this test, 30 grams of corn starch (0.167 A.G.U.) was gelatinized in 800 ml. of water and allowed to cool. It was then mixed with a cold chlorine water solution containing 0.103 mole of chlorine and the mixture was diluted to 3.0 liters. An ultraviolet lamp was used to illuminate the reaction mixture, and the temperature was 14 to 15° C. Within 20 minutes, about half of the chlorine had been consumed and after one hour, over 90% of the chlorine had been consumed. Thus, the gelatinization of the starch resulted in about an eight fold increase in the reaction rate.

*Example 5*

Chlorine water (2000 ml.) containing 0.082 mole of chlorine and 100 ml. of concentrated hydrochloric acid was placed in a one gallon sealed glass container. The solution was cooled to ice water temperature and this temperature was maintained throughout the course of the reaction. An ultraviolet lamp, without filter, was used to illuminate the reaction mixture. Corn starch (20.0 grams, 0.113 A.G.U.) was added and the mixture was shaken vigorously and stirred by means of a magnetic stirrer. At intervals, aliquot portions were removed and the amount of unreacted chlorine was determined.

The reaction was repeated using larger quantities of starch (30 grams, 0.169 A.G.U.) chlorine water (3300 ml.) and hydrochloric acid (150 ml.). A comparison of these results appears in the following tabulation:

| | | |
|---|---|---|
| Initial amount of chlorine (mM.) | 82 | 126 |
| Chlorine: starch mole ratio | 0.73 | 0.75 |
| Total chlorine consumed (mM.) | 42 | 87 |
| Total reaction time (hr.) | 7.25 | 7.25 |
| Reaction rate (mM. of chlorine consumed/liter/hr.) | 2.8 | 3.6 |
| Product recovery (percent) | 92 | 100 |
| Carbonyl content of product (mole percent) | 17.3 | 17.7 |
| mM. of carbonyl produced (based on complete recovery) | 19.6 | 29.9 |
| Ratio: Moles of chlorine consumed per mole of carbonyl produced | 2.1 | 2.9 |

It will be seen from the foregoing table that an increased rate of reaction occurred with larger amounts of material. We believe that this increased rate can be attributed to the greater amount of radiant energy directed on the reaction mixture since there was considerably more reactant area exposed above the ice-water cooling bath level.

It should be evident that various modifications can be made to the described embodiment without departing from the scope of the present invention.

We claim as our invention:

1. The method of making a high carbonyl content starch which comprises treating an aqueous starch suspension with dissolved chlorine at a pH not in excess of seven while irradiating the same with actinic light and at a temperature not in excess of about 60° C. until the carbonyl content of said starch is substantially increased, and recovering the product so produced.

2. The method of making a high carbonyl content starch which comprises treating an aqueous starch suspension containing less than about 10% by weight starch with chlorine water at a pH in the range from 0.5 to 6.0 while irradiating the same with actinic light and at a temperature not in excess of about 60° C. until the carbonyl content of said starch is substantially increased, and recovering the product so produced.

3. The method of making a high carbonyl content starch which comprises treating an aqueous starch suspension containing less than about 10% by weight starch with chlorine water at a pH in the range from 1.0 to 2.0 while irradiating the same with actinic light and at a temperature not in excess of about 60° C. until the carbonyl content of said starch is substantially increased, and recovering the product so produced.

4. The method of making a high carbonyl content starch which comprises treating an aqueous starch suspension containing less than about 10% by weight starch with chlorine water at a pH not in excess of seven while irradiating the same with ultraviolet radiation at a temperature not in excess of about 60° C. until the carbonyl content of said starch is substantially increased, and recovering the product so produced.

5. The method of making a high carbonyl content starch which comprises treating an aqueous starch suspension containing less than about 10% by weight starch with chlorine water at a pH in the range from 0.5 to 6.0 while irradiating the same with actinic light and at a temperature not in excess of about 60° C. until the carbonyl content of the product is at least 25 mole percent, and recovering the product so produced.

6. A modified starch product comprising a reaction product produced by treating an aqueous starch suspension with dissolved chlorine at a pH in the range from 0.5 to 6.0 while irradiating the same with actinic light and at a temperature not in excess of about 60° C. until the carbonyl content of said starch is increased to a value of at least 10 to 25 mole percent.

7. The method of making a high carbonyl content starch which comprises gelatinizing starch in aqueous suspension, treating the resulting dispersion with dissolved chlorine while irradiating the dispersion with actinic light at a temperature not in excess of 60° C., and a pH in the range from 0.5 to 6.0, and recovering the product so produced.

References Cited by the Examiner
UNITED STATES PATENTS
2,448,510   9/48   Barham _____ 260—233.3

OTHER REFERENCES

Radley: Manufacturing Chemist & Manufacturing Perfumer, July 1942, XIII, pages 161 and 166.

JOHN H. MACK, *Primary Examiner.*

JOHN R. SPECK, WINSTON A. DOUGLAS,
*Examiners.*